United States Patent [19]

Sugier et al.

[11] Patent Number: 5,269,349
[45] Date of Patent: Dec. 14, 1993

[54] FLEXIBLE PIPE COMPRISING AN ALUMINIUM ALLOY MATRIX COMPOSITE MATERIAL

[76] Inventors: André Sugier, 34, avenue de la Chataigneraie, 92500 Rueil Malmaison; José M. Herrero, 29, boulevard des Batignolles, 75008 Paris, both of France

[21] Appl. No.: 635,578

[22] PCT Filed: May 22, 1990

[86] PCT No.: PCT/FR90/00361
§ 371 Date: Mar. 5, 1991
§ 102(e) Date: Mar. 5, 1991

[87] PCT Pub. No.: WO90/14543
PCT Pub. Date: Nov. 29, 1990

[30] Foreign Application Priority Data

May 23, 1989 [FR] France ................. 89 06836

[51] Int. Cl.⁵ .................................. F16L 11/16
[52] U.S. Cl. .......................... 138/172; 138/129; 138/131; 138/133; 138/134; 138/144; 138/174
[58] Field of Search .......... 138/129, 130, 131, 132, 138/133, 134, 135, 144, 172, 174, 143, DIG. 2; 164/97

[56] References Cited

U.S. PATENT DOCUMENTS

| | | | |
|---|---|---|---|
| 2,640,501 | 6/1953 | Scott et al. | 138/130 |
| 2,793,949 | 5/1957 | Imich | 164/97 |
| 3,938,964 | 2/1976 | Schmidt | 138/143 |
| 3,982,904 | 9/1976 | Nayar | 138/143 |
| 4,053,011 | 10/1977 | Riewald et al. | 164/97 |
| 4,305,449 | 12/1981 | Loszewski et al. | 164/97 |
| 4,403,631 | 9/1983 | Abdullaev et al. | 138/130 |
| 4,473,103 | 9/1984 | Kenney et al. | 164/97 |
| 4,526,841 | 7/1985 | Yamatsuta et al. | 164/97 |
| 4,549,581 | 10/1985 | Unno et al. | 138/174 |
| 4,901,781 | 2/1990 | Ruff | 164/97 |
| 4,929,513 | 5/1990 | Kyono et al. | 164/97 |
| 5,020,583 | 6/1991 | Aghajanian et al. | 164/97 |
| 5,025,849 | 6/1991 | Karmarkar et al. | 164/97 |
| 5,104,029 | 4/1992 | Claar | 164/97 |

*Primary Examiner*—James E. Bryant, III
*Attorney, Agent, or Firm*—Antonelli, Terry, Stout & Kraus

[57] ABSTRACT

An armoured flexible pipe having one or more of the following components, a pressure resistant armouring, a traction resistant armouring and/or an internal carcase, in which pipe at least one of said components comprises one or more elongated elements such as a shaped piece, a cable, a wire or a strip. The element is formed of a composite material with aluminium alloy matrix comprising reinforcement elements such as particles and/or whiskers.

31 Claims, 1 Drawing Sheet

FLEXIBLE PIPE COMPRISING AN ALUMINIUM ALLOY MATRIX COMPOSITE MATERIAL

BACKGROUND OF THE INVENTION

The present invention relates to a new flexible pipe structure lighter in weight than prior art pipes while maintaining correct performances, particularly mechanical performances.

The invention applies in particular to the construction of flexible pipes for transporting pressurized fluids, such as water or hydrocarbons.

For numerous applications of such pipes, it is often desirable and sometimes necessary to have light weight flexible pipes, and flexible pipes having also a very good resistance to frictional wear, particularly for deep sea applications.

The flexible pipes in some variants of construction of the invention may in particular be laid at sea at greater water depths.

In fact, one of the problems met with during the laying of such flexible pipes in very deep water, results from the weight of the suspended flexible pipe.

The stress in the flexible pipe resulting from the weight increases the closer to the surface of the water starting from the bottom.

Thus, it is at the level of the means for holding the flexible pipe at the surface that the greatest stresses in the flexible pipe occur.

One means for reducing such stress, is to reduce the weight of the flexible pipe while substantially maintaining its mechanical performances, which is what the present invention proposes.

SUMMARY OF THE INVENTION

The flexible pipes to which the present invention applies in particular may comprise at least one of four components, each of which may have one or more elongated elements, such as a shaped section, a cable The components may, for example, include an internal carcase formed of a clipped strip or clipped or interfitted wires, a reinforcement sheathing, a reinforcement arch comprising a profiled elongated element, and an external carcase formed of a strip or clipped or interfitted wires.

Of course, preferably, these elongated elements may be wound helically so as to form the flexible pipe with or without a plastic sheath.

The present invention relates generally to all flexible pipes comprising a metal armour which are used under conditions such that the weight of this armour creates difficulties and all flexible pipes used in dynamics and where the problems of frictional wear of a metal layer on another metal layer may lead to wear of the elements and thereby reducing a service life of the flexible pipe.

More specifically, flexible pipes whose conditions of use are limited by the density of the metallurgical material forming the armouring elements, generally steel, because if the cross section of these elements is increased, in order to increase the mechanical strength of the flexible pipe, the result is an increase in weight of the flexible pipe and, consequently, an increase in the forces applied to the flexible pipe and as a function of which the elements forming the armouring are dimensioned.

Thus, an extremely interesting application for the invention relates to flexible ducts used in underwater oil production in medium or considerable water depths, which comprise ducting providing the connection between the sea bed and the surface (generally designated by the term risers) and the ducting which must be laid at depths from the surface, for providing the connection (over a distance which may vary considerably depending on the case) for example, between an underwater well head and the lower end of the riser, or else a collecting member (manifold) between several ducts and which forms the "base" of the "riser".

Such ducts are used for transporting crude oil or the gas produced by the underwater well under very high pressure, or for transporting gas or water injected under pressure into the producing formation, or for transporting to land or transporting as far as collecting and expedition installations (offshore loading stations for example), the oil or gas previously processed on board the production platform, or for controlling the underwater well heads (hydraulic or electric lines, called "umbilicals").

In the present state of the technique, all the known flexible pipes used or usable for the above described application for which the inner diameters may vary for example between 1" (2.54 cm) and about 20" (50.8 cm), and for the most usual applications, between 3" (7.62 cm) and 10" (25.4 cm) or 12" (30.48 cm) are made exclusively from steel armouring elements (carbon steels, stainless steels, alloyed steels).

When the depth of water in which the flexible pipes are to be installed remains relatively limited, from about 100 m to 200 or 300 m (which corresponds still today to the most frequent cases in the present state of the market), the water depth does not play an essential role as parameter for dimensioning the structure of the flexible pipe, which is mainly conditioned by the maximum value envisaged for the internal pressure.

On the other hand, already some underwater oilfields are brought into production in water depths in the range from 500 to 800 m and the tendency to operate in greater water depths is confirmed, with different projects exceeding 1000 m of water.

Now, in the present state of the technique, the characteristics of flexible pipes with steel armouring which represent the only available flexible pipes at present for the applications in question are such that from a water depth which may vary from 400 to 700 m, it is necessary to make special arrangemetns which have an important influence on the costs, in reinforcing the metal flexible pipe structure and/or using special procedures and equipment for on site positioning. Moreover, the ultimate water depth limits which may be reached with the presently known flexible pipes may be estimated to be about 600 m to 1000 m, or, at most, a little more than 1000 m for dimaters less than 6", with the limit varying in dependence upon a function of the diameter of the flexible pipe, of the maximum service pressure and other parameters having an influence on the dimensioning of the flexible pipe, such as the characteristics of the fluid transported, as well as the environmental conditions and the laying conditions.

Thus, generally, the invention finds an application wherever the weight of the presently available flexible pipes creates constraints for the user. Thus, for example, the high pressure pipes used on oil drilling sites, such as flexible injection pipes (rotary hose), well control lines (kill line, choke line), whose use and handling may be facilitated if lighter flexible pipes are available.

The invention may find another interesting application in floating flexible pipes which are used in particular in off-shore loading/unloading installations for connecting together a buoy anchored off-shore and a tanker moored to the buoy. Reducing a weight of the structure resulting from the use of an aluminium alloy matrix composite in fact substantially reduces the size of the buoys or other floating members which must be added to the flexible pipe to make it floatable and which have different drawbacks ( cost, size, current and wind drag).

The present invention make it possible to construct high mechanical strength flexible pipes of reduced weight and may also find application in, for example, aeronautics or space.

The use of an aluminium alloy matrix composite in the place of steel under the conditions which the invention allows is very advantageous for different special applications such as, for example, for forming the "clipped strip" carcases installed in certain cases by way of mechanical protection outside the flexible pipe by rolling the clipped strip about the external plastic sheath.

Moreover, in some cases, the replacement of steel (whatever the type of steel envisaged) by an aluminium alloy matrix composite may offer interesting advantages. Thus, for example, the inner carcase with which some flexible pipes are provided, particularly those intended for the transport of crude oil from the field ("rough bore" flexible pipes) being subjected to the corrosive action of the transported fluid, the use of an aluminium alloy matrix composite may, in some cases, offer a saving with respect to the cost of stainless steels which would be necessary.

Furthermore, the use of an aluminium alloy matrix composite may prove interesting in some cases where there exists a risk of pollution of the transported fluid by the material forming tha internal wall of the flexible pipe, which would exclude the use of steel (or at least carbon steel, independently of stainless steels which could be used if required but would be much more costly), for example, in the case of aqueducts, or ducts transporting certain chemical products.

Other cases may occur where certain properties of the aluminium alloy matrix composite are advantageous with respect to steel and thus create a possible interesting application for the invention, for example, the property of amagnetism of an aluminium alloy matrix composite.

The flexible pipe according to the present invention may be used in aerial installations, such for example as fluid transfer lines, particularly in a cold zone or for transferring a cold fluid. In fact, the flexible pipes of the present invention have a good shock resistance at low temperatures whereas usual steels break by resilience in temperatures of approximately $-20°$ C.

For this type of application, the flexible pipes according to the present invention may comprise aluminium alloy matrix composite for all the components of the flexible pipe (carcase, arch, armouring) or only for those exposed to temperatures approximately $-20°$ C. or less.

Thus, the invention may find an application in all cases where the aluminium alloy matrix composite has an advantage with respect to steel (lightness, resistance to wear, abrasion, resistance to corrosion effects . . . ) and where the relatively high mechanical forces applied to the flexible pipe (internal pressure, external pressure; crushing effect, axial load . . . ) require products (drawn wire, wires, cable, strip) used as armouring element which offer a high mechanical strength comparable to that obtainable with steel.

For producing flexible pipes lighter than presently available whose armouring is formed of steel elements, and also for producing the armourings of the flexible pipes with materials resisting certain particular effects, different solutions have already been proposed.

Thus, for example, in FR-2,283,768, FR-2,312,356 and EP 263,860 techniques have been proposed for producing the armouring wires for flexible pipes from a composite material formed of fibers embedded in a plastic resin.

The use of organic material composite materials makes it possible to go even further in reducing the weight the flexible pipe structures and, in particular in the case of the above mentioned deep sea applications, to make it possible to work underwater fields at extremely great water depths. But these organic matrix composite materials are relatively very costly and, by comparison, the aluminium alloy matrix composite is much more economical.

It has been discovered that the use of an aluminium alloy matrix composite in application of the invention must make it possible, in the case of applications to the above mentioned underwater production ducts, to construct installations in water depths which may reach and even exceed 1500 m, which makes it possible to envisage, for the aluminium alloy matrix composite in the above mentioned applications, a very important market, beyond the limits permitted by steel.

The present invention proposes an aluminium alloy matrix composite selection and processing and a flexible tube structure which considerably reduces the weight of the flexible pipe while making it possible to obtain products which are usable and which perform perfectly well.

The invention relates more particularly to the different metal armouring elements of the flexible pipes used in the above applications.

The aluminium alloy matrix composites which are used for manufacturing the flexible pipes according to the present invention are formed by a matrix of an aluminium alloy of the series 2000, 3000, 5000, 6000 and 8000 reinforced by particles or whiskers (the whiskers may be considered as short and discontinuous fibers of a diameter from 0.1 to 10 micron and a length of 10 to 600 microns, with the whiskers being usable in a mixture with the particles).

The reinforcement particles used are essentially graphite, alumina and silicon carbide particles of a size between 5 and, 400 microns and preferably, between 10 and 200 microns.

The weight fraction of the particles of whiskers used is less than 40% and, preferably, between 3 and 25l %.

The elongated elements with aluminium alloy matrix have the following advantages. More particularly, by the utilization of an aluminum alloy material, it is possible to increase the Young's modulus which plays an important role in the mechanical strength of certain elongated elements of the flexible pipe. Moreover, it is possible to increase the wear resistance, particularly by friction, between the wires of the same layer or between wires of two adjacent layers, and to increase the tensile strength and the elastic limit.

These reinforcement elements may be incorporated by stirring in a alloy in the semi pasty or liquid condition between the moment when it leaves the melting oven or when it is cast in a groove to give it a shape with trapezoidal cross-section of about 15 cm$^2$. The product thus obtained is then extruded when heat between 100 and 500° C. is applied so as to obtain either a cylindrical wire, for example of a diameter of 12 mm, 16 mm, 22 mm or 26 mm or in the form of a blank having the shape it is desired to give to the final product such as it will be used for manufacturing the flexible pipe.

It has been discovered that the hot extrusion operation provides a very good compactness of the metal matrix composite and allows very good adhesion to be obtained between the particle reinforcements and the whiskers and the aluminium alloy.

To facilitate the dispersion of the reinforcement elements, a fine nickel or copper film may be previously deposited on the surface of these particles or whiskers, this film being deposited, for example, by the chemical solution deposit method following the technique used for forming chemical nickel coatings or by spraying or impregnation of salts such for example as formiates, acetates, citrates, oxalates, nitrates etc. by thermal decomposition and reduction in the metal state.

Still within the scope of the present invention, other known methods may be used promoting the dispersion and/or adhesion of the reinforcement particles in the aluminium alloy matrix.

In the terms of the invention, one or other or any combination of the following flexible pipe armouring elements may, in particular, be made from an aluminium alloy matrix composite.

According to the present invention, the wires forming the so-called traction and bottom effect resistant armouring may also possibly absorb all or a part of the circumferential pressure effects as a function of the armouring angle which may vary, at the limit, between a few degrees and about 80°, but which is generally between 10° and about 65°.

The wires may have a cross-section which may be circular, possibly elliptic, or (very generally) rectangular with preferably rounded angles with the wires being made from an aluminium alloy matrix composite in accordance with the invention.

Moreover, the elements forming the traction and bottom effect resistant armouring may be fashioned in the form of strands or cables, themselves formed by the helical winding (cabling) of wires and, in accordance with the invention, be fashioned from an aluminium alloy matrix composite. In the case of using strands or cables as armouring element, generally the strands or cables of disposed inside a compact elastomer material mass.

Wires, or "shaped pieces" forming the "pressure armouring", whose purpose is to withstand the effects of the internal pressure, as well as the crushing effects (in particular related to the operations of laying the flexible pipe in the case of underwater ducts) and the external pressure effects. These shaped pieces are generally in the form of rectangular section wires, with preferably rounded corners.

They are generally in the form of a layer or two layers of shaped pieces whose cross-section has notches and projecting portions so as to provide a mutual locking effect, sometimes designated "clipping" such as, for example, a layer of one or more wires having a Z-shaped cross sectional configuration, for example, the profile designated generally under the name Zeta, see for example the description of a profile of this type in French patent 2 052 057; two layers of U-shaped cross-sectional wires, the legs of the U of the inner layer being directed outwardly so as to interfit with the legs of the inwardly direct U-shaped cross-sectional wires of the external layer; and other possible patterns.

It should be noted that the "pressure armouring" may be formed by combining several layers of one or other of the above described types.

The shaped pieces or wires forming the pressure armouring are wound at angles of about 80° to 90° with respect to to a longitudinal center axis of the flexible pipe.

Additionally, the elements forming the external carcase of the flexible pipes and composed of structures formed by bending a continuous strip and the structures formed by clipped or interfitted wires such as the pressure armouring with the bending being such so as to form, among other things, U shapes along the two edges of the strip for clipping adjacent turns. The bengind may be made in very varied patterns.

A very well known form is described in the French patent application EN-83/19 474 relating to a clipped strip which wherein a method of forming a flexible tube from a clipped strip is proposed which is applicable to the flexible pipes of the invention. These "clipped strips" are generally used as internal carcase for flexible pipes, in particular in the case of transporting crude oil from the field, so as to avoid the "implosion" of the internal plastic sheath.

They may also be used as pressure resistant armouring, when they are wound about the internal sealing sheath.

These clipped strip or clipped or interfitted wire structures may also be used as external protection for the flexible pipe.

The element forming the carcase may also be formed by a clipped or interfittable wire, such as a Z shaped cross-sectional wire, particularly in the Zeta form.

Thus, the present invention relates to a reinforced flexible pipe having one or more of the following components, a pressure resistant armouring or arch, a traction resistant armouring and/or an internal carcase.

The invention is characterized in that at least one of the components comprises one or more elongated elements such as a shaped piece, a cable, a wire or a strip, with the elongated element being formed of an aluminium alloy matrix composite material comprising reinforcement elements such as particles or whiskers in particular.

The aluminium alloy may be of the series 2000, 3000, 5000, 6000 or 7000.

The reinforcement elements may be formed of alumina or silicon carbide particles or whiskers used at a weight proportion of less than 40% and, preferably, between 3 and 25%.

Particles may be used having a size of between 4 and 400 microns, preferably, between 10 and 200 microns.

The term particles generally designates elements of a substantially mass shape whose mean support between the largest size and the smallest is less than 4. The size of a particle may be defined as being the largest dimension thereof.

The whiskers may have a diameter of 0.01 to 10 microns and, preferably, from 0.05 to 5 microns and a length of 10 to 600 microns and, preferably, from 10 to 400 microns.

When the duct according to the invention comprises a pressure resistant armouring and/or a traction resistant armouring, at least one of said armourings may comprise at least one elongated element formed of an aluminium alloy matrix composite in one of the series 2000, 3000, 5000, 6000 or 7000 and preferably in one of the following grades : 2014, 2017, 2024, 2117, 2124, 2618, 5050, 5052, 5056, 5082, 5086, 5154, 5183, 5754, 6005, 6060, 6061, 6063, 6066, 6070, 6081, 6082, 6181, 6351, 7001, 7020, 7049, 7050, 7075, 7090, 7091, 7175, 7178 or 7475.

The elongated element made from an aluminium alloy matrix composite may have a breakage strength under traction (Rm) at least equal to 300 MPa and preferably at least to 350 MPa.

When the duct according to the invention comprises an internal carcase, the latter may comprise at least one elongated element formed of an aluminium alloy matrix composite in one of the series: 1000, 2000, 3000, 4000, 5000, 6000, 7000 and, preferably, in one of the grades: 1100, 1180, 3103, 5050, 5052, 5056, 5083, 5456, 6060, 6061, 6082, 6083 or 6106.

When the duct according to the invention comprises a carcase, the latter may comprise at least one elongated element formed of an aluminium alloy matrix composite having a tensile breakage strength (Rm) at least equal to 200 MPa and, preferably, at least equal to 250 MPa and an elastic limit at 0.2% $Re_{0.2}$ at least equal to 150 MPa and, preferably, at least equal to 190 MPa.

When the duct according to the invention comprises an internal carcase with at least one elongated element formed of an aluminium alloy matrix composite material, this elongated element may be a shaped piece or an interfittable or clippable wire.

The elongated element according to the invention may be of the "Zeta" type.

Young's modulus of the elongated element made from a aluminium alloy matrix composite may be greater than 75000 MPa (7650 Kg/mm$^2$).

The elongated element may be subjected to a hot drawing or rolling operation.

The reinforcement elements may be introduced by addition with constant stirring in the aluminium alloy in the pasty or liquid state.

The elongated element formed of the aluminium alloy matrix composite material be subjected to a hammering operation as final processing preceded and/or followed by tempering.

The element may have undergone cold hammering having a rate of 3% at least in the case of using an aluminium alloy of the series 2000, 6000, 7000 or a rate of 10% at least in the case of using an aluminium alloy of the series 5000.

The elongated element may be subjected to cold hammering having a rate between 3 and 40% and, preferably, between 5 and 20% in the case of using an aluminium alloy matrix composite of the series 2000, 6000 or 7000.

The elongated element may be subjected to cold hammering having a rate between 20 and, 90% and, preferably, between 10 and 60% in the case of using an aluminium alloy composite of the series 5000.

The elongated element may be subjected to cold rolling or drawing.

The elongated element may be subjected to partial or total annealing or a tempering quenching operation whose characteristic parameters depend on the hammering rate and/or on the nature of the alloy.

The component comprising the aluminium composite material is coated with a protective alloy against corrosion.

When the duct according to the invention comprises a carcase, a sheath and armouring, with the carcase comprising a clipped strip or clipped wire particularly a Zeta wire, and with the armouring comprising an element which is a shaped piece, cable or wire, the clipped strip or wire of the carcase may be formed of a composite material with aluminium alloy matrix of the 2000, 3000, 4000, 5000, 6000 or 7000 series and/or the elongated element of the armouring maybe fashioned of an aluminium alloy matrix composite material of the series 2000, 5000, 6000 or 7000.

The carcase may be formed of a clipped steel or aluminium alloy strip or wire, and, in this case it is the armouring which will be made from an elongate element formed of an aluminium alloy matrix composite material or conversely.

The traction resistant armouring may comprise essentially steel and the arch may comprise essentially an aluminium alloy matrix composite material.

The pressure resistant armouring or the arch may comprise essentially steel and the traction resistant armouring may comprise essentially an aluminium alloy matrix composite material.

The duct according to the invention may comprise an anti-friction sheath which is preferably sealed and electrically insulated, between the arch and the traction resistant armouring.

The traction resistant armouring and the arch may comprise essentially an aluminium alloy matrix composite material of the series 2000, 3000, 5000, 6000 or 7000.

The duct of the invention may comprise an external strip of external clippable wire, formed possibly by an aluminium alloy matrix composite material.

The duct of the invention may comprise a pressure resistant armouring having at least one layer formed of a shaped piece having possibly a cross-section with interfittable shape, such as a Zeta, a "U" made from an aluminium alloy matrix composite of the series 2000, 5000, 6000 or 7000.

The present invention also relates to a method of producing an elongated element formed by an aluminium alloy matrix composite material. According to this method, the composite material is obtained by incorporating reinforcement elements by stirring in an aluminium alloy in the semi pasty or liquid condition. This incorporation of reinforcement elements may be made between the moment when the aluminium alloy leaves the melting oven and when the alluminium alloy is cast in a shaping groove.

The product thus cast may then be hot drawn and/or laminated at a temperature between 150° and 500° C.

The cast product may be transformed continuously by rolling into a product of great length.

It should be noted that in the present text in the designation "aluminium alloy matrix composite material" the term of material and/or that of matrix may be omitted.

The terms used to designate the metallurgical states and the thermal or mechanical processing of the aluminium alloys are defined in the standards NF 02 006 and NF 02 011.

Namely, in particular:
state F: raw manufacturing state,
state O: annealed
state H: hammered and possibly partially tempered,
state T: hardened by heat treatment—heat treatment considered as combinations of all or part of the following treatments: putting into a solution, hardening, aging, tempering with possible application of plastic deformations.

Of course, in the present invention, the elongated elements for which it is proposed to use an aluminium alloy matrix composite generally have a mechanical function. Sometimes, they may have an additional function because of their anti-corrosion characteristics.

The first prototypes have shown that flexible pipes comprising structural elements made from an aluminium alloy matrix composite may be manufactured without particular difficulty, with respect to the known flexible pipes with steel armouring. In particular, it has been found that, in the case of solid shaped pieces having relatively complex cross-sections of the "shaped wire" type such as Zeta wires, the manufacture of such shaped pieces from an aluminium alloy matrix composite is easier and less costly than in the case of the carbon steels generally used in the hyper performance flexible pipes to which the present invention mainly relates. It has also been discovered that the use of an aluminium alloy matrix composite makes it possible to manufacture wires or shaped pieces, including shaped pieces of the Zeta type, without difficulty in much larger cross-sectional dimensions than is possible in practice using steel. This is due, in particular, to the fact that the steel wires and shaped pieces are made from "machine wires" whose diameter is limited to about 20 mm in the present state of equipment and manufacturing processes used by different suppliers.

Under these conditions, the production of Zeta wires, for example, is limited to a maximum thickness of about 10 mm in the case of steel. On the other hand, in the case of an aluminium alloy matrix composite, the limitative measurement does not exist, because the manufacturing ranges are different. We have effectively verified that Zeta wires may be produced without difficulty in thicknesses which may reach 160 or 200 mm.

The advantage offered by the possibility of manufacturing very thick aluminium alloy matrix composite shaped pieces is in particular to make it possible to produce the pressure armouring with a single layer of very thick Zeta wires in the case where, with the internal pressure high and the diameter relatively large, the necessary thickness would exceed the maximum possible in steel. The result is the need to form the steel pressure armouring by superimposing two layers of wires (for example an inner layer of Zeta wires and an external layer of rectangular binding wires) and a substantial increase in the manufacturing cost which the aluminium alloy matrix composite avoids.

Furthermore, the possibility of forming very thick Zeta wires, using the aluminium alloy matrix composite, has in some cases the advantage of allowing the flexible pipe to be wound with smaller radii without any danger of unclipping.

BRIEF DESCRIPTION OF THE DRAWINGS

The present invention will be better understood and its advantages will be clearer form the following description of examples illustrated by the accompanying drawings, wherein.

DESCRIPTION OF THE PREFERRED EMBODIMENTS

Figure 1:
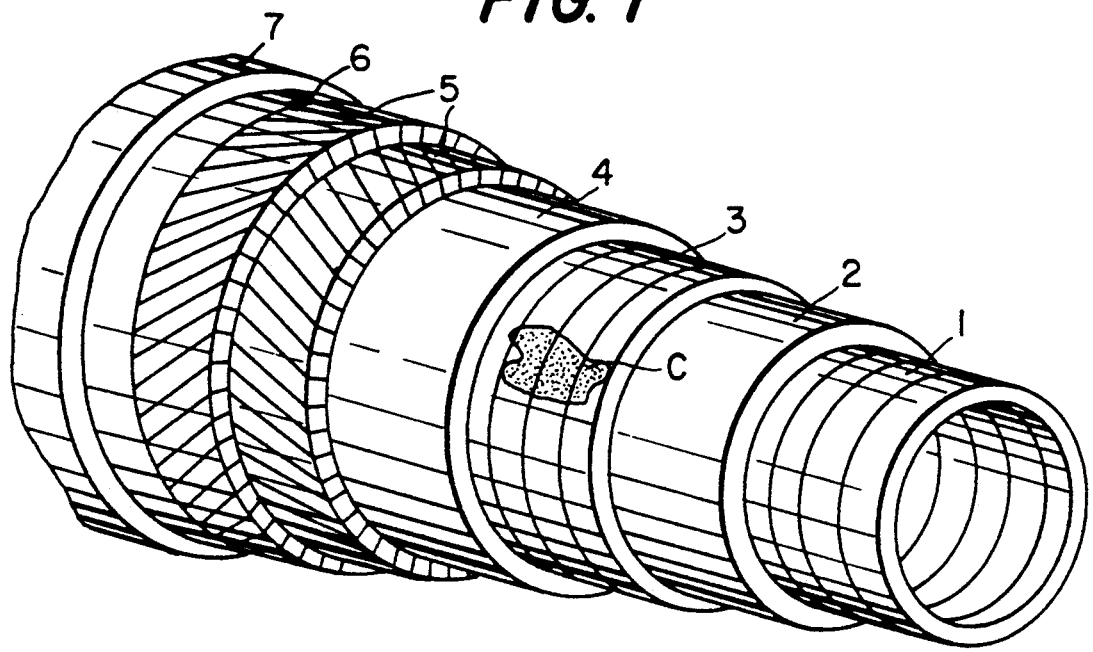
FIG. 1 shows a flexible pipe structure having an internal clipped carcase made from strip, or clipped or interfittable wires, a sealing sheath, a layer of clipped or interfittable wires, a sealing sheath, armourings 6, a ribbon and then an external sheath.

The examples numbered 1 to 11 concern a flexible pipe made with a configurations shown in FIG. 1, i.e. comprising successively an internal clipped carcase 1 which may be a strip clipped by bending or an interfitted or clipped wire, or intended to avoid crushing of the tube because of an external force whether it is distributed or not, the terms used by the technicians are "to avoid collapse", a Rilsan sheath 2, a Zeta shaped clipped wire or interfittable shaped piece layer (FIG. 3 or 4), an inner Rilsan sheath 4, armourings 5 at 35° with respect to the longitudinal center axis of the flexible pipe, a ribbon 6 then an external Rilsan sheat 7.

Sheath 4 may be sealing or not.

The mechanical characteristics are expressed in maximum tensile strength: Rm in Mpa, elasticity limit at 0.2% extension: Re in MPa, and percentage extension over 50 mm: A%, E Young's modulus in MPa.

In the tables given in the examples, the following columns are shown successively:
numbering of the layers,
description, nature and dimension (in mm) of the 20 layers,
Rm in MPa,
Kg/m=weight in kg per meter of flexible pipe,
D.i.=internal diameter in mm,
Ep.=thickness of the layer in mm,
the floatability factor is defined by:

$$\frac{\text{empty weight in air (kg/m)}}{\text{external volume (1/m)} \times 1.02 \text{ (density of sea water)}}$$

The axial damage limit load referenced in the Tables under the item "tensile damage limit" is defined in the theoretical case of a rectilinear flexible pipe subjected solely to an axial tractive force.

The "theoretical laying depth" in the table is a limit defined here as equal to the quotient of the limit
of an adequate safety coefficient. In the present state of the technique and, in particular, as a function of the different regulations applicable, this safety coefficient is currently equal to 2,
of different factors depending on the laying operations and whose effect is to increase the stresses in the elements forming the structure of the flexible pipe with respect to the reference case of the rectilinear flexible pipe subjected to an axial load only.

These overload factors are divided into two categories namely handels of the flexible pipe from the surface and dynamic forces due to movement.

More handling of the flexible pipe from the surface induces an increase of stress at the position where the flexible pipe is taken over by the laying equipment, with the latter being of different types, for example, a winch use limited in the case of high loads associated with great water depths), capstan, tracked (twin or tri-track) tensioners, or any type of linear winch associated with a system for clamping the flexible pipe for accommodating the axial load and also, in general, at least one zone (or simply a fixed support in the form of a curved gutter) for passing the flexible pipe overboard, Additionally, the dynamic forces defined by the movements are influential when a floating support is used for laying of the pipe, with such forces being a function of the limit sea conditions envisaged expressed in terms of vertical acceleration in the form of a coefficient increasing the apparent weight of the flexible pipe.

Thus, as already explained, the order of size of the maximum water depth admissible at laying of flexible pipe as a function of the damage limit under the effect of the weight of the flexible pipe may be evaluated, by way of summary estimation, from the "theoretical laying depth" mentioned in the tables, by dividing this latter by an overall reduction coefficient which takes into account both the safety coefficient and the overload factors related to the laying operations which may vary from single to double depending on the circumstances (handling of the flexible pipe by laying equipment and acceleration of the floating support). In practice, the overall reduction coefficient of the admissible load thus defined may vary from a little more than 2 in the most favorable cases to a maximum which may exceed 4.

To interpret simply and concretely the theoretical values of references shown in the tables, for this coefficient a typical mean value of 3 may be adopted, which will make it possible to compare the respective performances of the different flexible pipes cited as examples, although the water depth limit thus defined has, for each flexible pipe, only a very approximate meaning in absolute value. However that may be, the theoretical figures given in the tables make possible the comparison of the different examples.

The "collapse pressure" corresponds to the crushing strength limit of the flexible pipe under the effect of the external hydrostatic pressure, defined by the water depth. Because the structure is calculated on the assumption that the annular space may be subjected to the external pressure (accidental piercing of the external sheath for example) this value is conditioned by the crushing strength of the inner carcase when flexible pipes of the "rough bore" type which are described here as examples.

The maximum water depths acceptable for a flexible pipe, from the point of view of its resistance to external pressure, may be determined by applying to the "collapse pressure" referenced to water depth (pressure of the hydrostatic column as a function of the density of sea water) a safety coefficient of 1.5 which corresponds to the presently applicable regulations.

Evaluation of the maximum water depth is acceptable for a flexible pipe such as described in the examples.

The summary evaluation method outlined makes it possible, at the level of the relative values, to estimate the order of size of the respective performances of the different flexible pipes to be compared, it being understood that the absolute value of the depth acceptable for each of them may vary considerably as a function of the circumstances.

The mechanical properties mentioned for the structural elements of the flexible pipes described in the examples are relative to the state in which the aluminium alloy matrix composite structure elements are found once the last of the successive heat and/or mechanical treatments specified for each example has been accomplished, i.e. at the time when they will be wound on a reel ready to be installed in the machine used for manufacturing the flexible pipe (armouring machine, spiralling machine, . . . ).

Because the different metal armouring elements of the flexible pipes concerned by the invention are generally positioned on the flexible pipe so that they are located in the helical configuration imposed by the geometry of the flexible pipe and the armouring angle without having to undergo a substantial residual stress, i.e. they are laid and wound by plastic and not elastic deformation, these elements may then undergo a complementary operation of cold shaping. This relates not only to the case of strips which are to be formed by bending in the shaping tools of spiralling machines as in for example, FR-2 555 920 but also the case, for example, of the operations for pre-forming the armouring wires described in FR-2 528 733. Metal hammering which this ultimate cold deformation operation involves modifying the mechanical properties as they are mentioned in the examples. The result is, in particular, raising of the elastic limit which may, in some cases, be not inconsiderable, mainly when the aluminium alloy matrix composite element to be positioned in the machine for manufacturing the flexible pipe is in the annealed condition. The practical consequence of this situation is that the values characterizing the mechanical strength of the flexible pipes are minima, the real values being in some cases more or less greater than the values mentioned here in the examples.

Example 1 concerns an optimized flexible pipe not comprising an aluminium alloy matrix composite.

EXAMPLE 1

A flexible pipe with an internal diameter of 8"" (203.2 mm) is formed comprising an internal carcase formed of an AISI 304 stainless steel strip 2 mm thick with Rm=540 MPa and Re=450 MPa, an internal rilsan sheath 6 mm thick, a layer of clipped zeta wire 6.2 mm thick formed with an FM 15 steel having as characteristics: Rm=780 MPa, A=2.5%, two armouring layers at 35° made from an FM 15 steel, an external Rilsan sheath 7 mm thick.

This flexible pipe thus formed, has the following characteristics:

| Description | Rm MPa | Kg/m | D.i.mm | Ep.mm |
|---|---|---|---|---|
| 1. Stainless steel 304 strip carcase 80 × 2 mm | 540 | 31 | 203.2 | 10.0 |
| 2. Internal Rilsan sheath | | 4.9 | 223.2 | 6.0 |
| 3. FM 15 Zeta thickness: 6.2 mm | 780 | 31.2 | 235.2 | 6.2 |
| 4. Internal Rilsan sheath | | 5 | 247.6 | 6.0 |
| 5. FM 15 armourings at 35° thickness: 2.5 mm | 780 | 30.0 | 259.6 | 5.0 |
| 6. Ribbon | | 0.5 | 269.6 | 0.75 |
| 7. External Rilsan sheath | | 6.4 | 271.1 | 7.0 |

| Characteristics | English Unit | Metric Unit |
|---|---|---|
| Internal diameter | 8.00 in | 203.20 mm |
| External diameter | 11.22 in | 285.10 mm |
| Internal volume | 0.379 cf/ft | 35.18 l/m |
| External volume | 0.687 cf/ft | 63.84 l/m |
| Empty weight in air | 73.2 lb/ft | 108.9 kg/m |
| Weight full of sea water in air | 97.4 | 144.9 kg/m |
| Empty weight in sea water | 29.2 lb/ft | 43.4 kg/m |
| Weight full of sea water in sea water | 53.4 lb/ft | 79.5 kg/m |
| Floatability factor empty in sea water | | 1.66 |
| Bursting pressure | 5 350 psi | 369 bars |
| Collapse pressure | 1 570 psi | 108 bars |
| Traction damage limit | 382 685 lbs | 170 250 daN |
| Theoretical laying depth | | 2141 m |

As was mentioned, this flexible pipe is optimized in its design and the materials used.

EXAMPLE 2

A flexible pipe was formed such as the one of example 1 but in layer no 3 the clipped zeta wire 6.2 mm thick made from FM 15 steel is replaced by a clipped zeta wire 6.2 mm thick made from a 7079 aluminium alloy composite with a reinforcement of 25% of a mixture of whiskers and 90% of SiC particles having a mean size of 60 microns, in state T9. The addition of reinforcements was made by constant agitation at a temperature between 500 and 650° C. This operation was followed by hot drawing leading to a reduction of cross-section of about 70%. After the tempering operation, 7% cold hammering was carried out.

Under these conditions, the characteristics of the composite are: Rm=780 MPa; A=2%. The flexible pipe thus formed has the following characteristics:

| Description | Rm MPa | Kg/m | D.i.mm | Ep.mm |
|---|---|---|---|---|
| 1. Stainless steel 304 strip carcase 80 × 2 mm | 540 | 31 | 203.2 | 10.0 |
| 2. Internal Rilsan sheath | | 4.9 | 223.2 | 6.0 |
| 3. Al composite zeta thickness: 6.2 mm | 780 | 11.2 | 235.2 | 6.2 |
| 4. Internal rilsan sheath | | 5 | 247.6 | 6.0 |
| 5. FM 15 armourings at 35° thickness: 2.5 mm | 780 | 30.0 | 259.6 | 5.0 |
| 6. Ribbon | | 0.5 | 269.6 | 0.75 |
| 7. External Rilsan sheath | | 6.4 | 271.1 | 7.0 |

| Characteristics | English Unit | Metric Unit |
|---|---|---|
| Internal diameter | 8.00 in | 203.20 mm |
| External diameter | 11.22 in | 285.10 mm |
| Internal volume | 0.379 cf/ft | 35.18 l/m |
| External volume | 0.687 cf/ft | 63.84 l/m |
| Empty weight in air | 59.7 lb/ft | 88.9 kg/m |
| Weight full of sea water in air | 79.5 | 118.3 kg/m |
| Empty weight in sea water | 23.8 lb/ft | 24.5 kg/m |
| Weight full of sea water in sea water | 43.6 lb/ft | 59.2 kg/m |
| Floatability factor empty in sea water | | 1.33 |
| Bursting pressure | 5 350 psi | 369 bars |
| Collapse pressure | 1 570 psi | 108 bars |
| Traction damage limit | 382 685 lbs | 170 250 daN |
| Theoretical laying depth | | 2876 m |

It can be seen that for performances equivalent to those of the all steel flexible pipe described in example 1, the weight of the flexible pipe full of sea water in sea water is lightened by 25.5% and that the theoretical laying depth increases from 2141 m to 2876 m. A flexible pipe of equivalent characteristics may be formed with an Al 7091 composite with 25% filler material and Al 7049 with 30% reinforcement material.

EXAMPLE 3

A flexible pipe was formed identical to that of example 1 but in layer no. 3 the zeta FM 15 steel clipped wire 6.2 mm thick is replaced by a zeta wire 8 mm thick made from a 7090 aluminium matrix composite reinforced by 15% of alumina particles having a mean size of 50 microns.

| Description | Rm MPa | Kg/m | D.i.mm | Ep.mm |
|---|---|---|---|---|
| 1. Stainless steel 304 strip carcase 80 × 2 mm | 540 | 31 | 203.2 | 10.0 |
| 2. Internal Rilsan sheath | | 4.9 | 223.2 | 6.0 |
| 3. FM 15 Zeta thickness: 8.0 mm | 620 | 14.3 | 235.2 | 8.0 |
| 4. Internal Rilsan sheath | | 5 | 251.2 | 6.0 |
| 5. FM 15 armourings at 35° thickness: 2.5 mm | 780 | 30.5 | 263.2 | 5.0 |
| 6. Ribbon | 0.5 | 273.2 | 0.75 |
| 7. External rilsan sheath | | 6.4 | 274.7 | 7.0 |

| Characteristics | English Unit | Metric Unit |
|---|---|---|
| Internal diameter | 8.00 in | 203.20 mm |
| External diameter | 11.37 in | 288.70 mm |
| Internal volume | 0.379 cf/ft | 35.18 l/m |
| External volume | 0.705 cf/ft | 65.46 l/m |
| Empty weight in air | 62.3 lb/ft | 92.6 kg/m |
| Weight full of sea water in air | 86.5 lb/ft | 128.7 kg/m |
| Empty weight in sea water | 17.2 lb/ft | 25.5 kg/m |
| Weight full of sea water in sea water | 41.4 lb/ft | 61.6 kg/m |
| Floatability factor empty in sea water | | 1.38 |
| Bursting pressure | 5 386 psi | 371 bars |
| Collapse pressure | 1 570 psi | 108 bars |
| Traction damage limit | 388 638 lbs | 172 898 daN |
| Theoretical laying depth | | 2806 m |

The characteristics of the composite in sate T6 are RM=620 MPa, A=3%.

Under these conditions, the flexible pipe has the characteristics shown in the table above.

It can be seen that for performances equivalent to that of the all steel flexible pipe described in example 1, the weight of the flexible pipe full of sea water in sea water is reduced by 22.5% and that the theoretical laying depth increases from 2141 m to 2806 m.

A flexible pipe with substantially equivalent mechanical characteristics can be obtained using a matrix composite made from alloy 7050, 7178, 7075, 7001, in state T6 or H6, an alloy 2017A in state T4 followed by 10% hammering or alloys 2014, 2024, 2124 with a reinforcement of 20 to 30% silicon carbide particles.

EXAMPLE 4

A flexible pipe was formed identical to that of example 1 but, in layer no. 3, the FM 15 steel clipped zeta wire 6.2 mm thick is replaced by a clipped zeta wire 10 mm thick made from a 6061 aluminium matrix composite with a reinforcement of 20% of silicon carbide particles having a mean size of 50 microns, in state T8.

The characteristics of the composite are Rm=500 MPa, A=6%. Under these conditions the characteristics of the flexible pipe obtained are shown in the following table.

It can be seen that for identical characteristics of bursting pressure and collapse pressure, this flexible pipe full of sea water in sea water is reduced by 22% in weight with respect to the weight of the all steel flexible pipe of example 1 and that the theoretical laying depth is 2756 m against 2140 m

| Description | Rm MPa | Kg/m | D.i.mm | Ep.mm |
|---|---|---|---|---|
| 1. Stainless steel 304 strip carcase 80 × 2 mm | 540 | 31 | 203.2 | 10.0 |
| 2. Internal Rilsan sheath | | 4.9 | 223.2 | 6.0 |
| 3. Aluminium composite zeta thickness: 10 mm | 500 | 17.4 | 235.2 | 10.0 |
| 4. Internal Rilsan sheath | | 5.1 | 255.2 | 6.0 |
| 5. FM 15 armourings at 35° thickness: 2.5 mm | 780 | 31.0 | 267.2 | 5.0 |
| 6. Ribbon | | 0.5 | 277.2 | 0.75 |
| 7. External Rilsan sheath | | 6.5 | 278.7 | 7.0 |

| Characteristics | English Unit | Metric Unit |
|---|---|---|
| Internal diameter | 8.00 in | 203.20 mm |
| External diameter | 11.52 in | 292.70 mm |
| Internal volume | 0.379 cf/ft | 35.18 l/m |

| -continued | | |
|---|---|---|
| External volume | 0.724 cf/ft | 67.29 l/m |
| Empty weight in air | 64.8 lb/ft | 96.3 kg/m |
| Weight full of sea water in air | 89.0 lb/ft | 132.4 kg/m |
| Empty weight in sea water | 18.4 lb/ft | 27.4 kg/m |
| Weight full of sea water in sea water | 42.6 lb/ft | 63.4 kg/m |
| Floatability factor empty in sea water | | 1.40 |
| Bursting pressure | 5 398 psi | 372 bars |
| Collapse pressure | 1 570 psi | 108 bars |
| Traction damage limit | 392 805 lbs | 174 752 daN |
| Theoretical laying depth | | 2756 m |

EXAMPLE 5

A flexible pipe is formed like the one of example 1 but in layer no. 3 the FM 15 steel clipped zeta wire 6.2 mm thick is replaced by a clipped zeta wire of 12 mm thick made from a 5056 aluminium alloy matrix composite in state T9, with a reinforcement of 15% of silicon carbide particles having a mean size of 40 microns, with the characteristics shown in the table below.

It can be seen that for equivalent performances at the level of the bursting pressure and collapse pressure, the weight of the flexible pipe full of sea water in sea water was reduced by 18% and that the theoretical laying depth is 2812 m.

A flexible pipe having equivalent mechanical characteristics and weight can be obtained by replacing the 5056 aluminium alloy matrix by an alloy matrix of series 6000: alloys 6063, 6082 with a particle reinforcement of 10 to 20%.

A flexible pipe having equivalent mechanical characteristics can also be obtained with composites with a matrix of series 5000, but particularly the alloy 5082 in state H1 or H3X, with a reinforcement of 10 to 25% of silicon carbide and the matrix composites made from alloys 5050, 5183, 2117, 2618.

| Description | Rm MPa | Kg/m | D.i.mm | Ep.mm |
|---|---|---|---|---|
| 1. Stainless steel 304 strip carcase  80 × 2 mm | 540 | 31 | 203.2 | 10.0 |
| 2. Internal Rilsan sheath | | 4.9 | 223.2 | 6.0 |
| 3. Aluminium composite Zeta  thickness: 12.0 mm | 410 | 20.8 | 235.2 | 12.0 |
| 4. Internal Rilsan sheath | | 5.2 | 259.2 | 6.0 |
| 5. FM 15 armourings at 35° thickness: 2.5 mm | 780 | 31.3 | 271.2 | 5.0 |
| 6. Ribbon | | 0.5 | 281.2 | 0.75 |
| 7. External Rilsan sheath | | 6.6 | 282.7 | 7.0 |

| Characteristics | English Unit | Metric Unit |
|---|---|---|
| Internal diameter | 8.00 in | 203.20 mm |
| External diameter | 11.68 in | 296.70 mm |
| Internal volume | 0.379 cf/ft | 35.18 l/m |
| External volume | 0.744 cf/ft | 69.14 l/m |
| Empty weight in air | 67.2 lb/ft | 100.0 kg/m |
| Weight full of sea water in air | 91.4 lb/ft | 136.1 kg/m |
| Empty weight in sea water | 19.6 lb/ft | 29.2 kg/m |
| Weight full of sea water in sea water | 43.8 lb/ft | 65.2 kg/m |
| Floatability factor empty in sea water | | 1.41 |
| Bursting pressure | 5 386 psi | 371 bars |
| Collapse pressure | 1 570 psi | 108 bars |
| Traction damage limit | 412 147 lbs | 183 257 daN |
| Theoretical laying depth | | 2812 m |

EXAMPLE 6

A flexible pipe is formed such as that of example 1 but the FM 15 steel zeta layer 6.2 mm thick is replaced by a zeta wire layer 14 mm thick made from a 6082 alloy matrix composite in state T4 with 10% reinforcement of silicon carbide particles having a mean size of 20 microns whose mechanical characteristics are the following: $Rm = 359$ MPa, $A = 9 > \%$.

Under these conditions the characteristics of the flexible pipe are shown in the table below:

| Description | Rm MPa | Kg/m | D.i.mm | Ep.mm |
|---|---|---|---|---|
| 1. Stainless steel 304 strip carcase  80 × 2 mm | 540 | 31 | 203.2 | 10.0 |
| 2. Internal Rilsan sheath | | 4.9 | 223.2 | 6.0 |
| 3. Al composite Zeta thickness: 14.0 mm | 350 | 24.4 | 235.2 | 14.0 |
| 4. Internal Rilsan sheath | | 5.3 | 263.2 | 6.0 |
| 5. FM 15 armourings at 35° thickness: 2.5 mm | 780 | 31.9 | 275.2 | 5.0 |
| 6. Ribbon | | 0.5 | 285.2 | 0.75 |
| 7. External Rilsan sheath | | 6.7 | 286.7 | 7.0 |

| Characteristics | English Unit | Metric Unit |
|---|---|---|
| Internal diameter | 8.00 in | 203.20 mm |
| External diameter | 11.84 in | 300.70 l/m |
| Internal volume | 0.379 cf/ft | 35.18 l/m |
| External volume | 0.764 cf/ft | 71.02 l/m |
| Empty weight in air | 70.3 lb/ft | 104.7 kg/m |
| Weight full of sea water in air | 94.6 lb/ft | 140.8 kg/m |
| Empty weight in sea water | 21.5 lb/ft | 32.0 kg/m |
| Weight full of sea water in sea water | 45.7 lb/ft | 68.0 kg/m |
| Floatability factor empty in sea water | | 1.44 |
| Bursting pressure | 5 386 psi | 371 bars |
| Collapse pressure | 1 570 psi | 108 bars |
| Tracton damage limit | 419 965 lbs | 186 835 daN |
| Theoretical laying depth | | 2747 m |

It can be seen that the use of a zeta 14 mm thick made from an aluminium alloy matrix composite makes it possible to reduce the weight of the flexible pipe full of sea water in sea water by 14.5% with respect to the flexible pipe of example number 1 and that the theoretical laying depth increases to 2747 m.

A flexible pipe with identical mechanical characteristics can be obtained by replacing the 6082 alloy matrix composite by a composite with matrix made from alloys 5086, 5154, 5754, 5052 in state H1 or alloys 6005A, 6081, 6181, 63512, 6060, 6066, 6070 in state H1, T4 or T6 or T8 or T9, made from alloy 7020, 7050, 7175, 7475 in state T6 with a SiC or $Al_2O_3$ particle reinforcement of 8 to 25%.

EXAMPLE 7

A flexible pipe is formed like the one described in example 1 but the FM 15 steel zeta wire layer no. 3, 6.2 mm thick, is replaced by a zeta wire layer 16 mm thick made form a 5052 aluminium alloy matrix composite with 15% of silicon carbide reinforcement having a mean size of 30 microns in state H1, the final hammering being 20%, having mechanical characteristics $Rm = 310$ MPa, $A = 7\%$.

Under these conditions the characteristics of the flexible pipe obtained are the following:

| Description | Rm MPa | Kg/m | D.i.mm | Ep.mm |
|---|---|---|---|---|
| 1. Stainless steel 304 strip carcase  80 × 2 mm | 540 | 31.0 | 203.2 | 10.0 |
| 2. Internal Rilsan sheath | | 4.9 | 223.2 | 6.0 |
| 3. Al composite Zeta thickness: 16.0 mm | 340 | 28.4 | 235.2 | 16.0 |
| 4. Internal Rilsan sheath | | 5.4 | 267.2 | 6.0 |
| 5. FM 15 armourings at 35° | 780 | 32.3 | 279.2 | 5.0 |

-continued

| | | | |
|---|---|---|---|
| thickness: 2.5 mm | | | |
| 6. Ribbon | 0.5 | 289.2 | 0.75 |
| 7. External Rilsan sheath | 6.8 | 290.7 | 7.0 |

| Characteristics | English Unit | Metric Unit | |
|---|---|---|---|
| Internal diameter | 8.00 in | 203.20 mm | |
| External diameter | 12.00 in | 304.70 mm | |
| Internal volume | 0.379 cf/ft | 35.18 l/m | |
| External volume | 0.785 cf/ft | 72.92 l/m | |
| Empty weight in air | 73.3 lb/ft | 109.2 kg/m | |
| Weight full of sea water in air | 97.6 lb/ft | 145.2 kg/m | |
| Empty weight in sea water | 23.1 lb/ft | 34.4 kg/m | |
| Weight full of sea water in sea water | 47.4 lb/ft | 70.5 kg/m | |
| Floatability factor empty in sea water | | 1.46 | |
| Bursting pressure | 5 386 psi | 371 bars | |
| Collapse pressure | 1 570 psi | 108 bars | |
| Traction damage limit | 423 475 lbs | 188 397 daN | |
| Theoretical laying depth | | 2672 m | |

It can be seen that for identical characteristics of bursting pressure and collapse pressure, a weight reduction of 11.3% is obtained with this flexible pipe and that the theoretical laying depth is 2672 m.

A flexible pipe with substantially equivalent characteristics may be obtained by replacing the 5052 alloy in the matrix by the alloys 2017, 2117, 5050, 5154, 5754 in state H1, alloys 5056, 5082, 5086 and 5183 in state F or H and with a reinforcement of SiC or $Al_2O_3$ particles of 5 to 25%.

EXAMPLE 8

A flexible pipe is formed such as the one described in example 1 but layer no. 1 formed of an internal carcase made from an AISI 304 stainless steel strip 2 mm thick is replaced by a strip made from a 5052 aluminium alloy composite with a reinforcement of 20% of silicon carbide particles having a mean size of 15 microns in state H1 having a thickness of 3.5 mm and with Rm=340 MPa and Re =300 MPa and Young's modulus: 90,000 MPa.

Under these conditions, the characteristics of the flexible pipe obtained are as shown in the table below.

It can be seen that for a bursting pressure equivalent to that of the flexible pipe of example 1, a weight reduction of 11.4% is obtained and that the theoretical laying depth is 2578 m, with the collapse pressure being increased from 106 to 144 bars.

A flexible pipe with identical characteristics will be obtained, whatever the grade and the state of the aluminium matrix used for the internal carcase, preferably using the alloys having the best corrosion resistance and particularly the alloys 1100, 1180, 3003, 5052, 5056, 5083, 5456, 6060, 6061, 6082, 6083, 6106. The alloys of series 2000 and series 7000 may also be used and their particle reinforcement content will be 5 to 25% by weight.

| Description | Rm MPa | Kg/m | D.i.mm | Ep.mm |
|---|---|---|---|---|
| 1. Al composite strip carcase 140 × 3.5 | 320 | 19.3 | 203.2 | 17.5 |
| 2. Internal Rilsan sheath | | 5.2 | 238.2 | 6.0 |
| 3. FM 15 Zeta thickness: 6.7 mm | 780 | 35.8 | 250.2 | 6.7 |
| 4. Internal Rilsan sheath | | 5.3 | 263.6 | 6.0 |
| 5. FM 15 armourings at 35° thickness: 2.5 mm | 780 | 31.8 | 275.6 | 5.0 |
| 6. Ribbon | | 0.5 | 285.6 | 0.75 |
| 7. External Rilsan sheath | | 6.7 | 287.1 | 7.0 |

| Characteristics | English Unit | Metric Unit |
|---|---|---|
| Internal diameter | 8.00 in | 203.20 mm |
| External diameter | 11.85 in | 301.10 mm |
| Internal volume | 0.403 cf/ft | 37.41 l/m |
| External volume | 0.766 cf/ft | 71.21 l/m |
| Empty weight in air | 70.2 lb/ft | 104.5 kg/m |
| Weight full of sea water in air | 96.0 lb/ft | 142.9 kg/m |
| Empty weight in sea water | 21.5 lb/ft | 32.0 kg/m |
| Weight full of sea water in sea water | 47.3 lb/ft | 70.4 kg/m |
| Floatability factor empty in sea water | | 1.43 |
| Bursting pressure | 5 365 psi | 370 bars |
| Collapse pressure | 4130 psi | 144 bars |
| Traction damage limit | 407 937 lbs | 181 484 daN |
| Theoretical laying depth | | 2578 m |

EXAMPLE 9

A flexible pipe is formed such as that of example 1 but layer no. 1 formed of an internal AISI 304 stainless steel strip carcase 2 mm thick is replaced by an internal carcase formed by a zeta wire 12 mm thick made from an Al 3103 aluminium alloy matrix composite with 20% reinforcement of silicon carbide particles having a mean size of 20 microns, in state H1, with Rm=250 MPa and Re =220 Mpa, Young's modulus of 90,000 MPa and in layer no. 3 the thickness of the FM steel zeta wire is increased to 6.4 mm.

Under these conditions, the characteristics of the flexible pipe are as follows:

| Description | Rm MPa | Kg/m | D.i.mm | Ep.mm |
|---|---|---|---|---|
| 1. Aluminium composite Zeta thickness: 12.0 mm | 250 | 18.6 | 203.2 | 12.0 |
| 2. Internal Rilsan sheath | | 4.6 | 227.2 | 6.0 |
| 3. FM 15 Zeta thickness: 6.4 mm | 780 | 32.7 | 239.2 | 6.4 |
| 4. Internal Rilsan sheath | | 5.1 | 252.0 | 6.0 |
| 5. FM 15 armourings at 35° thickness: 2.5 mm | 780 | 30.6 | 264.0 | 5.0 |
| 6. Ribbon | | 0.5 | 274.0 | 0.75 |
| 7. External Rilsan sheath | | 6.5 | 275.6 | 7.0 |

| Characteristics | English Unit | Metric Unit |
|---|---|---|
| Internal diameter | 8.00 in | 203.20 mm |
| External diameter | 11.40 in | 289.50 mm |
| Internal volume | 0.349 cf/ft | 32.43 l/m |
| External volume | 0.709 cf/ft | 65.82 l/m |
| Empty weight in air | 66.2 lb/ft | 98.5 kg/m |
| Weight full of sea water in air | 88.6 lb/ft | 131.8 kg/m |
| Empty weight in sea water | 21.1 lb/ft | 31.3 kg/m |
| Weight full of sea water in sea water | 43.4 lb/ft | 64.5 kg/m |
| Floatability factor empty in sea water | | 1.46 |
| Bursting pressure | 5 428 psi | 374 bars |
| Collapse pressure | 1 768 psi | 159 bars |
| Traction damage limit | 391 495 lbs | 174 169 daN |
| Theoretical laying depth | | 2700 m |

It can be seen that for a bursting pressure identical to that of the flexible pipe of example 1, the use of an internal zeta wire carcase 12 mm thick made from an aluminium composite increases the collapse pressure to 159 bars and that a weight reduction of 18.8% was obtained with the theoretical laying depth being 2700 m.

The alloy Al 3103 may be replaced in the matrix by any other alloy from the series 1000, 2000, 3000, 4000, 5000, 6000, 7000.

EXAMPLE 10

A flexible pipe is formed as for example 1 but the stainless steel strip of the internal carcase is replaced by a zeta wire 14 mm thick made from 6061 alloy having as characteristics: Rm=350 MPa, Re=320 MPa, E=70 000 MPa, in the pressure arch (layer no. 3) the FM 15 zeta wire is replaced by a zeta wire 10 mm thick made from 2017 aluminium alloy having as characteristics Rm 510 MPa and, in the traction layer, the FM 15 steel armouring is replaced by armouring made from 3.6 mm thick wire formed of a 7090 aluminium matrix composite with 20% SiC particle reinforcement and having as characteristics Rm=620 MPa and A=3%.

Under these conditions the characteristics of the flexible pipe are the following:

| Description | Rm MPa | Kg/m | D.i.mm | Ep.mm |
|---|---|---|---|---|
| 1. Aluminium zeta thickness: 14.0 mm | 400 | 21.2 | 203.2 | 14.0 |
| 2. Internal Rilsan sheath | | 4.6 | 231.2 | 6.0 |
| 3. Aluminium zeta thickness: 10.0 mm | 510 | 17.9 | 243.2 | 10.0 |
| 4. Internal Rilsan sheath | | 5.3 | 263.2 | 6.0 |
| 5. Al composite armourings at 35° thickness: 3.6 mm | 620 | 15.8 | 275.2 | 8.0 |
| 6. Ribbon | | 0.5 | 289.6 | 0.75 |
| 7. External Rilsan sheath | | 6.8 | 291.1 | 7.0 |

| Characteristics | English Unit | Metric Unit |
|---|---|---|
| Internal diameter | 8.00 in | 203.20 mm |
| External diameter | 12.07 in | 306.70 mm |
| Internal volume | 0.349 cf/ft | 32.43 l/m |
| External volume | 0.795 cf/ft | 73.11 l/m |
| Empty weight in air | 49.8 lb/ft | 72.11 kg/m |
| Weight full of sea water in air | 72.1 lb/ft | 105.5 kg/m |
| Empty weight in sea water | −1.1 lb/ft | −2.7 kg/m |
| Weight full of sea water in sea water | 21.2 lb/ft | 30.6 kg/m |
| Floatability factor empty in sea water | | 0.96 |
| Bursting pressure | 5 413 psi | 370 bars |
| Collapse pressure | 2 724 psi | 188 bars |
| Traction damage limit | 427 166 lbs | 198 038 daN |
| Theoretical laying depth | | 6471 m |

It can be seen that for equivalent bursting pressure performance a flexible pipe is obtained with a weight reduction of 61% of the flexible pipe full of sea water in sea water and that the theoretical laying depth increases from 2141 m to 6471 m, with the collapse pressure being 188 bars.

EXAMPLE 11

A flexible pipe identical to that of example 10 is formed but, in layer no. 1, the aluminium alloy zeta wire is replaced by a zeta wire made from 5052 aluminium alloy matrix composite reinforced by 20% of silicon carbide particles having a mean size of 70 microns and with characteristics: Rm=340 MPa, Re=300 MPa, A=4%, E=100 000 MPa and in layer no. 3 the aluminium alloy zeta alloy matrix composite identical to that used for the pressure arch armouring.

Under these conditions, the characteristics of the flexible pipe are as follows:

| Description | Rm MPa | Kg/m | D.i.mm | Ep.mm |
|---|---|---|---|---|
| 1. Aluminium composite zeta thickness: 14.0 mm | 400 | 21.2 | 203.2 | 14.0 |
| 2. Internal Rilsan sheath | | 4.6 | 231.2 | 6.0 |
| 3. Aluminium zeta thickness: 10.0 mm | 620 | 17.9 | 243.2 | 10.0 |
| 4. Internal Rilsan sheath | | 5.3 | 263.2 | 6.0 |
| 5. Al composite armourings at 35° thickness: 3.6 mm | 620 | 15.8 | 275.2 | 7.2 |
| 6. Ribbon | | 0.5 | 289.6 | 0.75 |
| 7. External Rilsan sheath | | 6.8 | 291.1 | 7.0 |

| Characteristics | English Unit | Metric Unit |
|---|---|---|
| Internal diameter | 8.00 in | 203.20 mm |
| External diameter | 12.01 in | 305.10 mm |
| Internal volume | 0.349 cf/ft | 32.43 l/m |
| External volume | 0.787 cf/ft | 73.11 l/m |
| Empty weight in air | 48.6 lb/ft | 72.30 kg/m |
| Weight full of sea water in air | 70.9 lb/ft | 105.5 kg/m |
| Empty weight in sea water | −1.8 lb/ft | −2.7 kg/m |
| Weight full of sea water in sea water | 20.5 lb/ft | 30.6 kg/m |
| Floatability factor empty in sea water | | 0.96 |
| Bursting pressure | 6 434 psi | 444 bars |
| Collapse pressure | 2 724 psi | 275 bars |
| Traction damage limit | 427 166 lbs | 205 509 daN |
| Theoretical laying depth | . . . lbs | 6715 m |

It can be seen that with respect to the flexible pipe of example 1, a weight reduction of 61% in weight of the flexible pipe full of sea water in sea water is obtained and that the bursting pressure increases 370 to 444 bars. The collapse pressure increases from 108 to 275 bars and the theoretical laying depth increases from 2171 m to 6715 m.

With respect to the flexible pipe of example 10, the bursting pressure increases from 370 to 444 bars, the collapse pressure increases from 188 to 275 bars and the theoretical laying depth from 6471 to 6715 m.

In addition, wear tests carried out in the laboratory between two wires made from an aluminium matrix composite alloy with 20 of silicon carbide having a mean size of 70 microns showed that the wear rate was reduced by a factor at least equal to 10 with respect to the wear rate of wires made aluminium alloy wires without reinforcement.

Similarly, this wear rate, by friction with relative movements of one wire on the other of 3 to 10 mm and contact pressures of 20 to 180 bars representative of the range of friction conditions which may be met with in a flexible pipe in service is, in the case of composite wires always less, by a variable factor depending on the test conditions, but going from 1.5 to 4, than the wear rate obtained under the same conditions by friction of two FM 15 steel wires.

From the above applications, in the case of example 1, the order of size of the possible water depth can be evaluated approximately and specifically at about 713 m, for comparison with the other examples, with this value being the lowest of the two limitations which can be directly estimated from the indications given in the tables="theoretical laying depth limit"=2,140 m divided by 3, namely 713 m, and "collapse pressure"=1,115 m divided by 1.5, giving 743 m.

We recall that limitation by the weight of the flexible pipe as a function of its axial strength, in particular, may in actual fact vary at least from onefold to twofold depending on the circumstances.

If the same evaluat,ion is applied to example 11, the depth reached is greater than 1,800 m.

In examples 2 to 7 and 10, the preceding evaluation would lead to underestimating the laying depths. In fact, in these examples, the internal carcase has not been dimensioned to correspond to the laying pressure, in order to be able to compare the flexible pipes with each other.

It should be noted that the "collapse" only occurs if the external sheath which is generally sealed is pierced and if, in addition, the sheath 4 is not sealed or has a sealing defect.

Thus, if the flexible pipe has no defect, it is possible to evaluate the installation depth, to take into account the theoretical laying depth and not to take into account the limitation given in the example.

The present invention applies to tubes having structures other than that shown in FIG. 1.

The present invention may be applied particularly to flexible pipes having an internal tube made from a plastic or elastomer material with or without carcase, etc.

Figure 2:
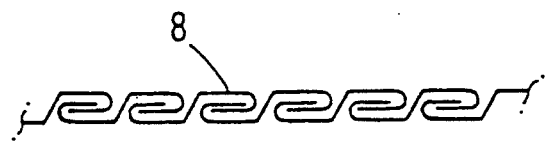
FIG. 2 shows in section a strip clipped by bending.

FIG. 2 shows in cross section a layer formed of a clipped strip 8. This layer generally forms the internal carcase 1.

Figure 3:
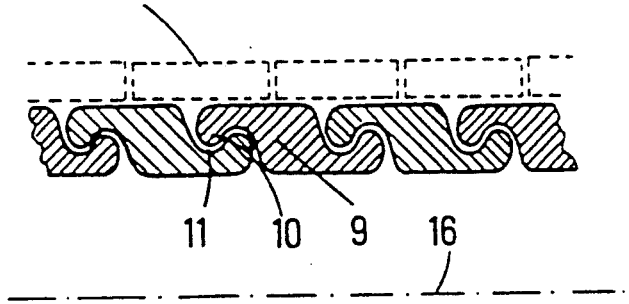
FIGS. 3 and 4 are cross-sectional views of interfittable or clippable profiles which may also be designated interfitted or clipped wires.

FIG. 3 shows a profiled element 9 in zeta form. This shape makes it possible to provide a portion 10, such as a lobe or rounded portion, which cooperates with a recess 11 of the adjacent turn. Thus, interfitting of adjacent turns is obtained.

The zeta shaped piece generally serves for forming the pressure resistant armouring, but may also serve for forming the internal carcase 1.

Without departing from the present invention, other shaped piece forms than the zeta may be used, particularly simple shapes, such as shaped pieces with rectangular section or "U" shapes.

In FIG. 3, a rectangular shaped piece 12 has been shown with dotted lines which completes the pressure armouring. Thus, in this example, the pressure armouring combines a zeta shaped piece and a piece with rectangular section placed preferably outside the zeta shaped piece, with respect to the inside of the flexible pipe.

Figure 4:
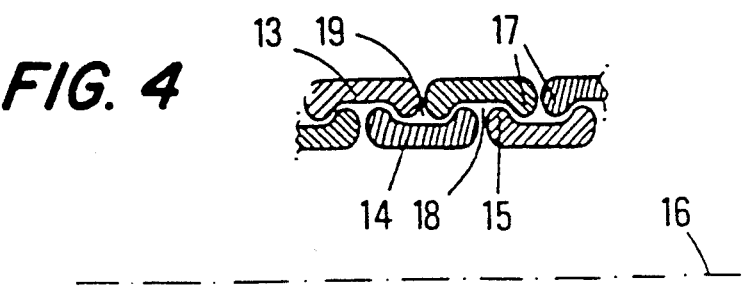

FIG. 4 shows another example of the pressure resistant armouring, this armouring is formed of two wires or shaped pieces 13 and 14 having a helically wound "U" shaped section. One of these shaped pieces 14 has the arms 15 of the "U" open outwardly, with respect to the axis of the flexible pipe 16 and the other 13 has the arms 17 of the "U" open towards the axis of the tube.

Arms 17 of shaped piece 13 cooperate with the recess of the "U" of piece 14 and conversely the arms 15 of shaped piece 14 cooperate with the recess 19 of the "U" of piece 13.

Without departing from the present invention some elements may be embedded in a flexible elastomer resin, particularly if the elements of the traction resistant armouring are embedded in a rubber sheath.

Among the different flexible pipe structures to which the present invention may apply, in addition to those given in the examples the following will in particular be noted:

a) a flexible pipe according to FIG. 1, but without sheath 4, with a traction resistant armouring 5 and a pressure resistant armouring 3 made from an aluminium alloy matrix composite in the series 2000, 5000, 6000 or 7000.

b) a flexible pipe according to FIG. 1, but without pressure resistant armouring 3, or sheath 4 and with one at least of the elongated elements remaining in the structure which comprises an aluminium alloy matrix composite in the series 2000, 5000, 6000 or 7000, c) a flexible pipe according to FIG. 1, but having in addition the pressure resistant armouring element 3 in the form of a zeta, a binding or elongated element with simple shaped cross section, with particularly with rectangular cross section, with or without sheath 4, one at least of the elongated elements remaining in the structure which comprises an aluminium alloy matrix composite in the series 2000, 5000, 6000 or 7000, d) all the examples given in the present application comprising an internal carcase 1 and a sheath 2, but replacing them by a sealed tube sufficiently flexible to allow the final product to be flexible, but having sufficient rigidity so as not to be crushed during manufacture of the flexible pipe.

According to the present invention, when two different metal layers follow each other, for example made from an aluminium alloy matrix composite then steel, or in some cases of different types of aluminium alloys, it may be preferable to insert an insulating sheath.

Furthermore, without departing form the scope of the present invention an anti-friction material sheath or layer may be inserted between the different layers forming one of the components of the invention and particularly in the case of the traction resistant armouring when it is made from steel.

In the present invention, the components comprising aluminium alloy matrix composites in the series 2000, 3000, 5000, 6000 or 7000 may preferably be formed essentially of these aluminium alloys.

It should be understood that in the present invention, when denominations are used for the aluminium alloy matrix composites of series 2000, 3000, 5000, 6000 or 7000, it is a question, except for a specific case, of all the alloy grades belonging to each of the series.

The flexible pipe according to the present invention may in particular comprise organic matrix composite materials.

In the examples given above (examples 2 to 11), the conditions mentioned for the different aluminium alloys correspond to preferred states.

The grades and states mentioned in the examples 2 to 7 and 11 for the elongated elements included in the pressure resistant armouring or arch, may be used for the aluminium alloy matrix composite elongated elements in the traction resistant armourings.

Moreover, without departing from the scope of the present invention, one of the aluminium alloys of the series, of the grades and/or of the states mentioned in the present invention may be replaced by another equivalent aluminium alloy.

What is claimed is:

1. A reinforced flexible pipe having at least one of a pressure resistant armouring, a traction resistant armouring or an internal carcase, wherein at least one of said components comprises at least one elongated element fashioned as one of a shaped piece, a cable, a wire or a strip, said at least one elongated element being formed of an aluminum alloy matrix composite material having reinforcement elements including at least one of particles or whiskers made of at least one of alumina or silicon carbide at a weight ratio of less than 40%, with the particles having a size in a range of between 4 to 400 microns and the whiskers having a diameter of 0.01 to 10 microns and a length of 10 to 600 microns, said elongated element having a tensile strength of at least 300 MPa and a Young's Modulus greater than 75,000 MPa.

2. The pipe as claimed in claim 1, wherein said composite has an aluminium alloy matrix of the series 2000, 3000, 5000, 6000 or 7000.

3. The pipe as claimed in claim 2, comprising a pressure resistant armoring and/or a traction resistant armouring, wherein at least one of said armourings has at least one elongated element formed of a composite with an aluminum alloy matrix in one of the series 2000, 3000, 5000, 6000 or 7000.

4. The pipe as claimed in claim 1, comprising an internal carcase, wherein said carcase comprises at least one elongated element formed of a composite with an aluminum alloy matrix in one of the series of 1000, 2000, 3000, 4000, 5000, 6000, 7000.

5. The pipe as claimed in claim 1, comprising a carcase, wherein said carcase comprises at least one elongated element formed of an aluminum alloy matrix composite having a tensile breakage strength at least equal to 200 MPa.

6. The pipe as claimed in claim 1, comprising an internal carcase with at least one elongated element formed of an aluminum alloy matrix composite, said elongated element being one of an interfittable or clippable wire or shaped piece.

7. The pipe as claimed in claim 4, wherein said elongated element is of a Z-shaped configuration.

8. The pipe as claimed in claim 1, wherein the elongated element is one of hot drawn or rolled.

9. The pipe as claimed in claim 1, wherein the reinforcement elements are introduced with constant stirring in the aluminum alloy in one of a pasty or liquid state.

10. The pipe as claimed in claim 6, wherein said elongated element formed of said aluminum alloy matrix composite material is subjected to a hammering operation as a final processing preceded and/or followed by tempering.

11. The pipe as claimed in claim 2, wherein said elongated element is subjected to a cold hammering having a rate of 3% with an aluminum alloy of the series 2000, 6000, 7000 or a rate of 10% with an aluminum alloy of the series 5000.

12. The pipe as claimed in claim 2, wherein said elongated element is subjected to cold hammering having a rate between 3 and 40%.

13. The pipe as claimed in claim 2, wherein said elongated element is subjected to a cold hammering having a rate between 20 and 90%.

14. The pipe as claimed in claim 1, wherein said elongated element is subjected to cold rolling or drawing.

15. The pipe as claimed in claim 11, wherein said elongated element is subjected to one of partial or total annealing or a tempering quenching operation with characteristic parameters depending upon at least one of the hammering rate or nature of the aluminum alloy.

16. The pipe as claimed in claim 1, wherein said component comprising the aluminium composite material is coated with a protective alloy against corrosion.

17. The pipe as claimed in claim 1, comprising a carcase, a sheath and armouring, said carcase comprising a clipped strip or clipped wire, and said armouring comprising an element which is a shaped piece, cable or wire, wherein said clipped strip or wire of said carcase is formed of a composite material with aluminum alloy matrix of the 2000, 3000, 4000, 5000, 6000, or 7000 series and/or said elongated element of said armouring is formed of a composite with an aluminum alloy matrix of the series 2000, 5000, 6000 or 7000.

18. The pipe as claimed in claim 17, comprising a carcase formed of one of a clipped steel or aluminum alloy strip or wire.

19. The pipe as claimed in claim 17, wherein said armouring comprises at least one of a steel or an aluminum alloy.

20. The pipe as claimed in claim 1, wherein said traction resistant armouring comprises essentially steel and said pressure resistant armouring comprises essentially an aluminum alloy matrix composite material.

21. The pipe as claimed in claim 1, wherein said pressure resistant armouring comprises essentially steel and said traction resistant armouring comprises essentially an aluminum alloy matrix composite material.

22. The pipe as claimed in claim 21, comprising an anti-friction sheath disposed between the pressure resistant armouring and the traction resistant armouring.

23. The pipe as claimed in claim 1, wherein said traction resistant armouring and said pressure resistant armouring comprise essentially a composite material with an aluminum alloy matrix of the series 2000, 3000, 5000, 6000 or 7000.

24. The pipe as claimed in claim 1, comprising an external strip or external clippable wire.

25. The pipe as claimed in claim 1, comprising a pressure resistant armouring having at least one layer formed of a shaped piece having a cross-section with interfittable shape and fashioned from composite material with an aluminum alloy matrix of the series 2000, 5000, 6000 or 7000.

26. The pipe as claimed in claim 1, comprising a pressure resistant armouring and/or a traction resistant armouring, wherein at least one of the armourings has at least one elongated element formed from a composite with an aluminum alloy matrix of the series 2014, 2017, 2024, 2117, 2124, 2618, 5050, 5052, 5056, 5082, 5086, 5154, 5183, 5754, 6005, 6060, 6061, 6063, 6066, 6070, 6081, 6082, 6181, 6351, 7001, 7020, 7049, 7050, 7075, 7090, 7091, 7175, 7178, 7475.

27. The pipe as claimed in claim 1, comprising an internal carcase, wherein said carcase comprises at least one elongated element formed of a composite with an aluminum alloy matrix in one of the series of 1100, 1180, 3103, 5050, 5052, 5056, 5083, 5456, 6060, 6061, 6082, 6083 or 6106.

28. The pipe according to claim 5, wherein the tensile breakage strength is at least equal to 250 MPa and has an elastic limit at least equal to 150 MPa.

29. The pipe according to claim 28, wherein the elastic limit is at least equal to 190 MPa.

30. The pipe as claimed in claim 2, wherein said elongated element is subjected to cold hammering having a rate between 5 and 20% with an aluminum alloy matrix composite of the series 2000, 6000, or 7000.

31. The pipe according to claim 13, wherein said elongated element is subjected to a cold hammering having a rate of between 10 and 60% with an aluminum alloy matrix composite of the series 5000.

* * * * *